United States Patent
Shimamura et al.

(10) Patent No.: US 6,473,684 B2
(45) Date of Patent: Oct. 29, 2002

(54) CONSTANT VEHICLE SPEED MAINTAINING DEVICE FOR MOTORCYCLE

(75) Inventors: Koichi Shimamura; Yusuke Funayose; Yoji Kanaoka; Koji Kano, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/796,520

(22) Filed: Mar. 2, 2001

(65) Prior Publication Data

US 2001/0032047 A1 Oct. 18, 2001

(30) Foreign Application Priority Data

Mar. 3, 2000 (JP) ........................................ 2000-059390

(51) Int. Cl.[7] .............................. B60K 31/00; F02D 9/08
(52) U.S. Cl. ........................... 701/93; 701/94; 701/110; 180/179
(58) Field of Search .............................. 701/93, 110, 68, 701/94; 180/179, 170; 123/360, 350

(56) References Cited

U.S. PATENT DOCUMENTS

| 4,610,230 A | * | 9/1986 | Saito et al. ................. 123/360 |
| 5,319,557 A | * | 6/1994 | Juman ........................ 180/179 |

FOREIGN PATENT DOCUMENTS

JP B2344007 7/1991

* cited by examiner

*Primary Examiner*—Tan Nguyen
(74) *Attorney, Agent, or Firm*—Birch, Stewart, Kolasch & Birch, LLP

(57) ABSTRACT

To provide an auto-cruise canceling device for maintaining a good operating response of the vehicle. A DC servo-motor is used as an actuator for regulating a throttle opening during auto-cruising. When a throttle grip is turned during regulation of the throttle opening by the servo-motor, namely, during a cruising state, a turning force transmitted to a throttle drum through a throttle cable causes a variation in the load on the motor. An ECU detects load variations based on the current in the servo-motor. If the load variation is not less than a predetermined value, it is judged that a rider's cruise canceling action has been made, and bias of the servo-motor is stopped, thereby canceling the cruising state.

19 Claims, 3 Drawing Sheets

CONSTANT VEHICLE SPEED MAINTAINING DEVICE FOR MOTORCYCLE

BACKGROUND OF THE INVENTION

1. Field of the Invention

The present invention relates to a constant vehicle speed maintaining device for a motorcycle. More particularly to a constant vehicle speed maintaining device for a motorcycle that is capable of canceling a constant vehicle speed state impairing the operating characteristics and without requiring a complex construction.

2. Description of Background Art

Motorcycles are known that have a constant vehicle speed maintaining device for maintaining the operating speed at a constant value for the purpose of alleviating the fatigue of the driver during operation, for cutting fuel cost by restraining vehicle speed variations, etc. In the constant vehicle speed maintaining device, it is required to cancel the constant vehicle speed state (hereinafter referred to as "cruising state"). Hitherto, it has been known to cancel the cruising state in response to the following actions: an action of returning a throttle grip against a turning force of an actuator which biases a throttle valve under the cruising state, an action of applying a brake to a front wheel or a rear wheel, an action of gripping a clutch lever, etc.

FIG. 4 illustrates a major part of a constant vehicle speed maintaining device which cancels a cruising state by detecting an action of returning the throttle grip. As illustrated in FIG. 4, a shaft (throttle shaft) 2 of a throttle valve (not shown) of an engine is disposed to penetrate a throttle body 1, and a throttle drum 3 and a throttle link 4 are attached to ends of the throttle shaft 2. A cable 6 for transmitting turning torques in acceleration and deceleration directions on a throttle grip 5 to the throttle drum 3 is wrapped around between the throttle drum 3 and the throttle grip 5.

In a cruising state a cancellation detector (cancel detector) 7, a first drum 71 connected with one end of the cable 6 and a second drum 72 connected with the other end of the cable 6 are disposed coaxially and turnably. A torsion spring 73 is provided between the first drum 71 and the second drum 72. The first drum 71 and the second drum 72 are turned as one body through the spring 73. A switch 8 is provided for detecting the cancellation of the cruising state when there arises such a displacement differential in the turning direction that the torsion spring 73 is deformed by not less than a predetermined amount, between the first drum 71 and the second drum 72.

On the other hand, the throttle link 4 is connected with a negative pressure type actuator 10 through a control cable 9. The negative pressure type actuator 10 is connected to the engine (not shown) through a solenoid unit 11, which regulates the introduction of engine negative pressure and atmospheric pressure to control the inside pressure. A diaphragm (not shown), disposed in the negative pressure type actuator 10, expands and contracts according to the inside pressure of the negative pressure type actuator 10, and the expanding and contracting actions are transmitted through the control cable 9 to the throttle link 4, whereby the throttle opening under the cruising state is controlled. The solenoid unit 11 is so controlled so as to respond to a setting signal for the cruising state and for maintaining the current vehicle speed. The solenoid unit 11 is controlled by an ECU 12 that includes a microcomputer. The ECU 12 is inputted with a vehicle speed signal, an engine revolution number signal (NE), cruising state setting and other control signals, a cruising state cancellation signal (cancel signal) is outputted from the switch 8, and the like.

During normal operation, the first drum 71 and the second drum 72 are turned synchronously with the rotation of the throttle grip 5, and the motion of the throttle grip is directly transmitted through the cable 6 to the throttle drum 3. On the other hand, when the throttle grip 5 is turned to the deceleration side in order to cancel a cruising state, a tension (pulling force) is applied to the portion of the cable 6 connected to the drum 72, because the throttle shaft 2 is biased by the negative pressure type actuator 10 through the throttle link 4, and the drum 72 will turn counterclockwise as illustrated in FIG. 4. In this case, since the portion of the cable 6 connected to the drum 71 is restrained from turning by the throttle drum 3, the drum 71 does not turn. Therefore, the torsion spring 73 is displaced by being pulled by the drum 72. When the displacement surpasses a predetermined amount, the switch 8 outputs a cancel signal, and the ECU 12 outputs a cruising state canceling instructions to the solenoid unit 11. A constant vehicle speed maintaining device similar to the above-described is disclosed in Japanese Patent Publication No. 3-44007.

In the constant vehicle speed maintaining device as described above, the cancel detector 7 is disposed, for example, on the cable 6, and is located between the throttle grip 5 and a carburetor 1. However, the cable 6 must be laid out to take into consideration the steering requirements of the steering handle in the case of a motorcycle, so that degree of freedom in the layout is extremely small. Under such a limited degree of freedom, the layout of the cable 6 and the layout of the cancel detector 7 is not easy.

In addition, since the cable 6 for regulating the throttle opening is bisected by the cancel detector 7, friction in the areas of the cable connection is increased. Further, since the layout of the cancel detector 7 is difficult as mentioned above, the cable 6 is not always laid out in the appropriate location, so that friction between the cable 6 and its casing increases. An increase in friction causes an increase in throttle load and an increase in the play in the connection areas. This increased friction can impair the operation characteristics, namely, the response performance of the acceleration and deceleration to the operations on the throttle grip.

SUMMARY AND OBJECTS OF THE INVENTION

It is an object of the present invention to provide a constant vehicle speed maintaining device which solves the above-mentioned problems of the prior art, can be easily mounted on a motorcycle with minor requirements concerning the layout, and can enhance the operational characteristics of the vehicle.

In order to attain the above object, the present invention is characterized by providing a throttle opening control means for controlling the throttle opening by a turning torque of a throttle grip. A DC servo-motor is provided for maintaining the throttle opening at a current vehicle speed in response to a constant vehicle speed maintaining instruction. A load detecting means is provided for detecting the load on the DC servo-motor when the DC servo-motor is operating in response to the constant vehicle speed maintaining instruction. A control means is provided for stopping the operation of the DC servo-motor and canceling the cruising state when the load on the DC servo-motor as detected by the load detecting means has varied.

In addition, the invention is characterized by providing a control means that cancels the cruising state when the load variation is not less than a predetermined amount and has continued for a predetermined period.

Further, the invention is characterized by providing a control means that cancels the cruise state when a load variation due to a turning torque in a decelerating direction on the throttle grip is detected.

Accordingly when the throttle grip is turned where the servo-motor is operating in response to the constant vehicle speed maintaining instruction, the throttle opening is going to vary regardless of the operation of the servo-motor, so that the load on the servo-motor varies. As a result, the load detected by the load detector varies, and the control means stops the operation of the servo-motor and cancels the cruising state.

According to the present invention, the turning of the throttle grip can be accurately detected. In addition, the cruising state may be canceled in response only to the rider's clear cruise canceling action by turning the throttle grip in the direction for decelerating the vehicle. Therefore, in an accelerating operation, the vehicle is smoothly accelerated to perform a lane change or the like.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
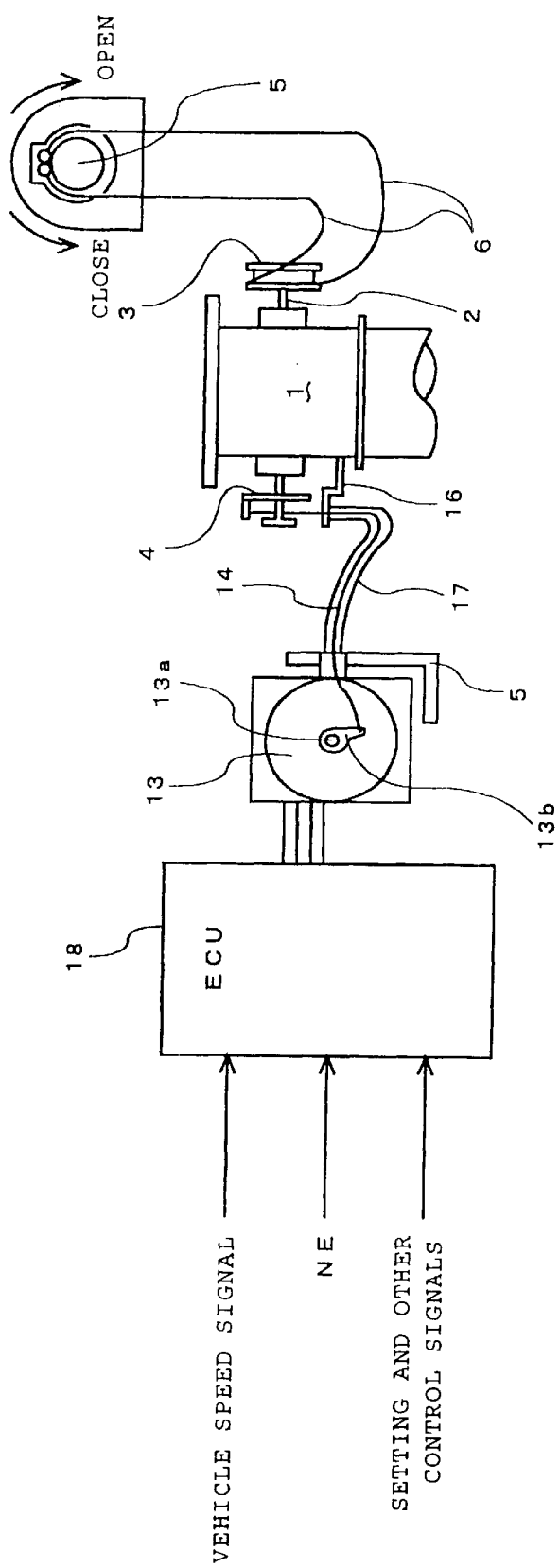
FIG. 1 is a schematic diagram of the constant vehicle speed maintaining device according to one embodiment of the invention.

One embodiment of the present invention will be described referring to the drawings. FIG. 1 is a schematic diagram showing the constitution of a major part of a constant vehicle speed maintaining device for a motorcycle according to one embodiment of the invention. As illustrated in FIG. 1, a throttle shaft 2 of a throttle valve (not shown) of the engine projects through a throttle body 1, and is biased by a spring (not shown) in the direction for closing the throttle valve. A throttle drum 3 and a throttle link 4 are attached, respectively, to the ends of the throttle shaft 2. In order to transmit turning torques in the acceleration and deceleration directions on a throttle grip 5 to the throttle drum 3, a throttle cable 6 having both its ends fixed to the throttle grip 5 is disposed between the throttle drum 3 and the throttle grip 5. The opening of the throttle valve is controlled and the number of revolutions of the engine (not shown) is controlled by turning the throttle grip 5 to the acceleration side and the deceleration side. The throttle grip 5 is provided at a right end portion of a steering handle of the motorcycle.

On the other hand, for regulating the opening of the throttle valve during a cruising state, a DC servo-motor 13 is provided as an actuator for turning the throttle link 4 in the "open" direction of the throttle valve. The turning torque on the DC servo-motor 13 is transmitted to the throttle link 4 through, for example, a cruising state control cable (hereinafter referred to simply as "control cable") 14. The control cable 14 is passed through a tube 17 both ends of which are respectively held by a support member 5 for the servo-motor 13 and by a bracket 16 fixed to the throttle body 1. One end of the control cable 14 is connected to an end portion of the throttle link 4, and the other end is connected to an end portion of a link 13b fixed to the shaft 13a of the servo-motor 13.

The servo-motor 13 is controlled by an ECU 18 which includes a microcomputer. The servo-motor 13 responds to a cruising state setting signal (inputted to the ECU 18 in response to an operation of a switch provided in the vicinity of the throttle grip), and is controlled to maintain the current vehicle speed. The ECU 18 is inputted with a vehicle speed signal, an engine revolution number signal (NE), cruising state setting signal and other control signals, and so on. The ECU 18 comprises a driver for the servo-motor 13 and a detection circuit for an electric current flowing in the servo-motor 13. One example of the current detection circuit and a terminal voltage detection circuit will be described later.

The ECU 18 has the function of canceling the bias of the servo-motor upon recognizing the driver's cruise canceling action through the operation on the throttle grip 5, based on the current flowing in the servo-motor 13. When the throttle grip 5 is turned to the deceleration side where a cruising state is set according to the setting signal, namely, where the throttle shaft 2 is biased by the servo-motor 13, the turning torque causes the load on the servo-motor 13 to vary (increase). The level of the load is judged based on the current flowing in the servo-motor 13. The presence or absence of a cruise canceling action is judged based on whether the current representing the load has exceeded a predetermined value, and the bias of the servo-motor 13 is stopped when it is judged that the cruise canceling action has been made.

Figure 2:
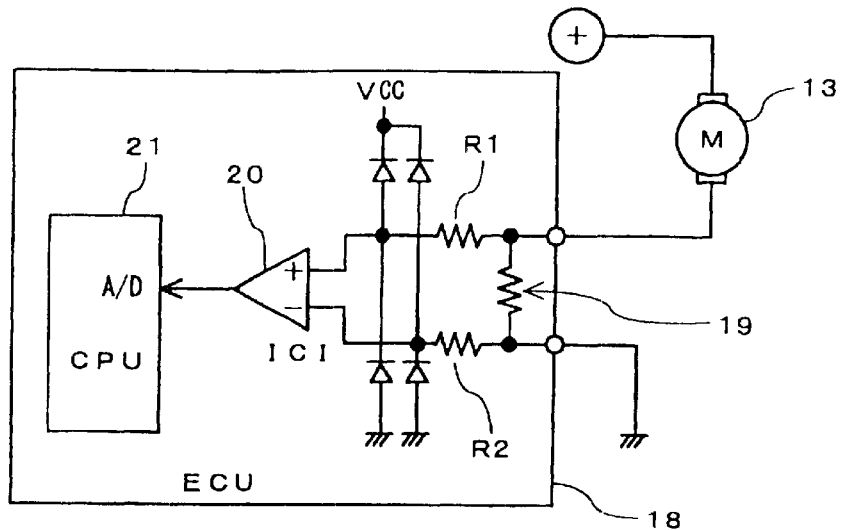
FIG. 2 is a circuit diagram of a load detector based on motor current.

FIG. 2 illustrates one example of a current detection circuit for the servo-motor 13. In FIG. 2, a power source is connected to the plus side of the servo-motor 13, and the minus side is grounded through a current detection shunt 19. Electric potentials at both ends of the shunt 19 are connected to the input side of an operational amplifier 20 through resistors R1, R2 respectively. The operational amplifier 20 outputs a voltage according to the difference between the potentials at both ends of the shunts 19 inputted through the resistors R1 and R2. The output from the operational amplifier 20 is connected to an A/D converter input terminal of a microcomputer (CPU) 21. The CPU 21 discriminates the presence or absence of a cruise canceling action following an algorithm described later, based on the current in the servo-motor represented by the output of the operational amplifier 20.

Figure 3:
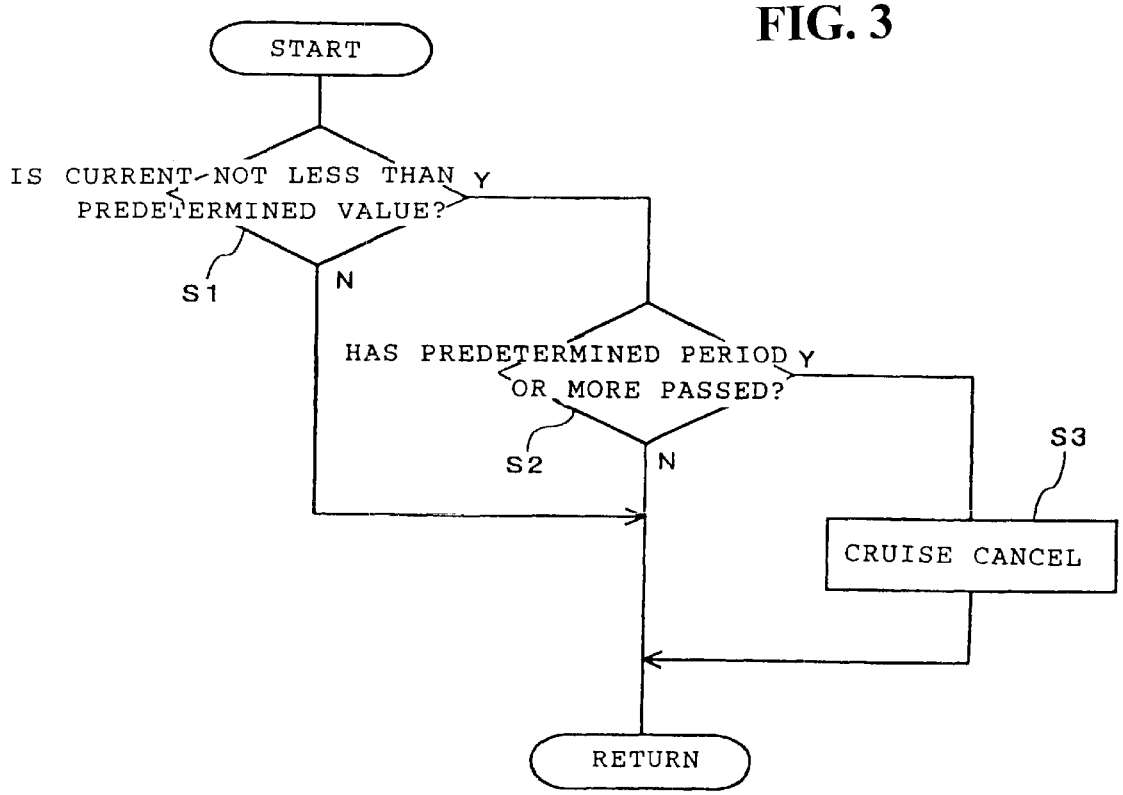
FIG. 3 is a flow chart showing an algorithm for cancellation of cruising.
Figure 4:
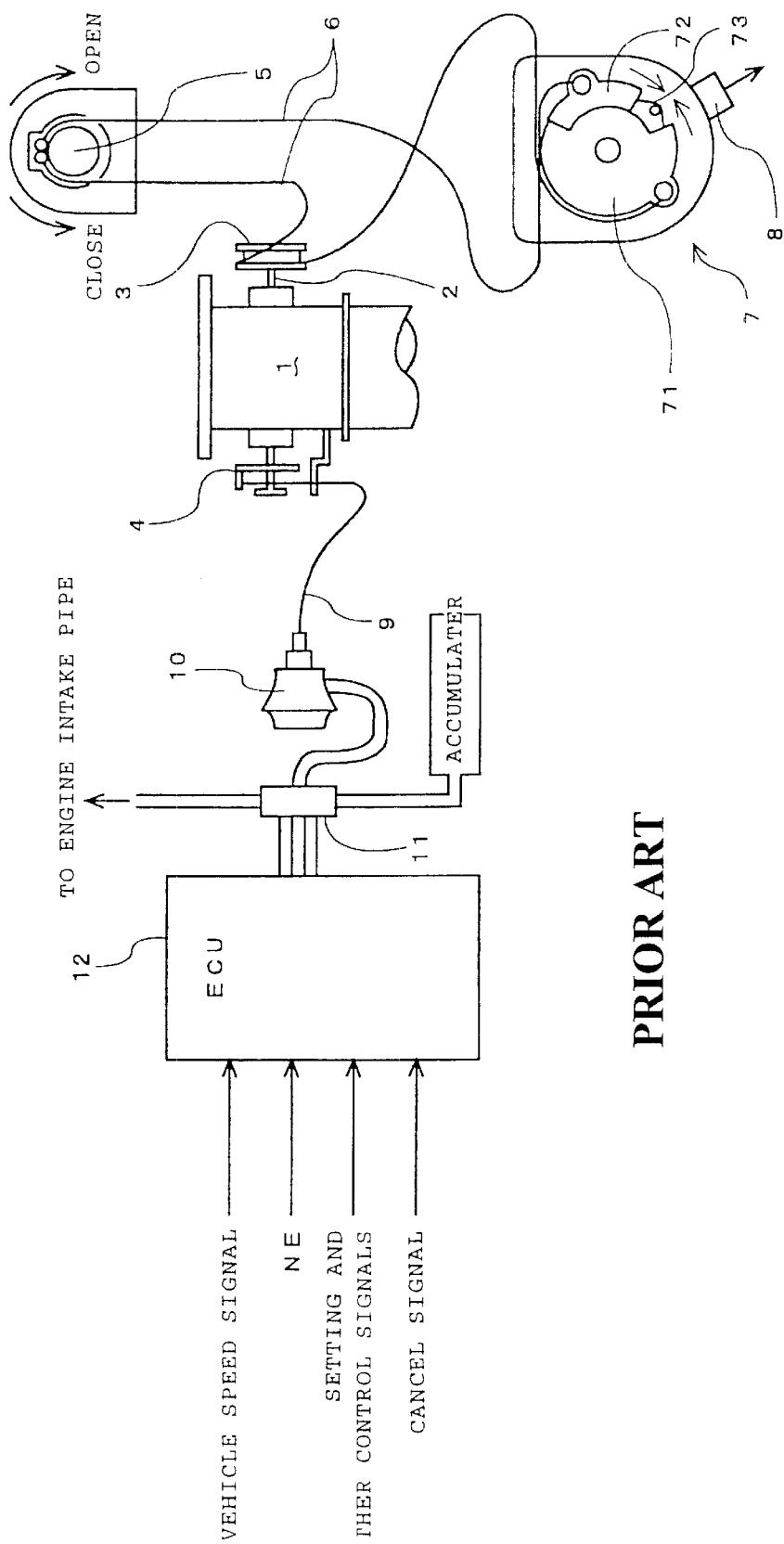
FIG. 4 is a schematic diagram of a constant vehicle speed maintaining device according to the prior art.

FIG. 3 is a flow chart showing a judging algorithm for the cruise canceling action. In FIG. 3, in Step S1, it is judged whether the current flowing in the servo-motor 13, namely, the output voltage of the operational amplifier 20 is not less than a predetermined value. If it is judged that the current flowing in the servo-motor 13 is not less than the predetermined value, the algorithm enters into Step S2, where it is judged whether the state of the current not less than the predetermined value has been maintained for a predetermined period. If the judgment in the Step S2 is affirmative, the algorithm enters Step S3, where a cruise canceling instruction is outputted to stop the bias of the servo-motor 13.

On the other hand, when the current flowing in the servo-motor 13 has not reached the predetermined value or when the current is not less than the predetermined value but has not been maintained for the predetermined period, it is decided that the cruise canceling action has not been made, and so a cruise canceling instruction is not outputted.

As has been described above, in the present embodiment, the opening of the throttle valve is controlled by the DC servo-motor 13 to realize a cruising state, and the presence or absence of a cruise canceling action is recognized based on a variation of the load on the servo-motor 13. The cruise canceling action may not necessarily be accomplished by turning the throttle grip 5 in the deceleration direction, but may be carried out by turning the throttle grip 5 in the acceleration direction. In that case, the load on the servo-motor 13 is reduced, so that the presence or absence of a cruise canceling action is recognized by detecting a reduction in the current in the servo-motor 13 to or below a predetermined value.

The criterion value of the current in the servo-motor 13 for judging the increase in load can be set according to the capacity of the servo-motor 13; for example, the lock current value, i.e. maximum allowable current value of the servo-motor 13 can be used as the criterion value for judging an increase in the load.

As is clear from the above description, according to the present invention, it is needless to dispose a switch means for the detection of the turning of the throttle grip at an intermediate part of the throttle cable or the like location. Therefore, the turning of the throttle grip is transmitted directly to the throttle shaft and, accordingly, the operational response of the vehicle to a throttle grip operation is enhanced.

In addition, according to the present invention, the cruising state is canceled only in response to the definite intention of an operator, not based on an instantaneous movement or a small movement of the throttle grip. Further, according to the present invention, the cruising state is canceled in response only to the decelerating operation, and the vehicle can be accelerated smoothly by an accelerating operation. Therefore, a lane change for passing or the like can be accomplished swiftly according to the operator's intention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A constant vehicle speed maintaining device for a motorcycle, comprising:
   a throttle opening control means for controlling a throttle opening by a turning torque of a throttle grip;
   a DC servo-motor for maintaining the throttle opening at a current vehicle speed in response to a constant vehicle speed maintaining instruction;
   a load detecting means for detecting a load on said DC servo-motor when said DC servo-motor is operating in response to said constant vehicle speed maintaining instruction; and
   a control means for canceling the constant vehicle speed maintenance and stopping the operation of said DC servo-motor when the load on said DC servo-motor detected by said load detecting means is not less than a predetermined value.

2. The constant vehicle speed maintaining device for a motorcycle according to claim 1, wherein said control means cancels the constant vehicle speed maintenance when said load variation is not less than a predetermined amount and has continued for a predetermined period.

3. The constant vehicle speed maintaining device for a motorcycle according to claim 2, wherein said control means cancels the constant vehicle speed maintenance when a load variation due to a turning torque in a decelerating direction on said throttle grip is detected.

4. The constant vehicle speed maintaining device for a motorcycle according to claim 2, wherein said control means is an ECU for receiving input relative to at least a vehicle speed, engine revolutions, cruising state and the load on the DC servo-motor for determining the cruise speed control operation of the vehicle.

5. The constant vehicle speed maintaining device for a motorcycle according to claim 4, wherein said ECU includes a microcomputer for receiving inputted signals and for processing the signals to determine the cruise speed control operation of the vehicle.

6. The constant vehicle speed maintaining device for a motorcycle according to claim 5, wherein said microcomputer determines if a load on said DC servo-motor is not less than a predetermined value operating for a predetermined period of time for determining the cruise speed control operation of the vehicle.

7. The constant vehicle speed maintaining device for a motorcycle according to claim 5, wherein the current supplied to the DC servo-motor is detected and said microcomputer determines if the current supplied to said DC servo-motor is reduced below a predetermined value operating for a predetermined period of time for determining the cruise speed control operation of the vehicle.

8. The constant vehicle speed maintaining device for a motorcycle according to claim 1, wherein said control means cancels the constant vehicle speed maintenance when a load variation due to a turning torque in a decelerating direction on said throttle grip is detected.

9. The constant vehicle speed maintaining device for a motorcycle according to claim 1, and further including a control cable operatively positioned between said DC servo-motor and said throttle opening control means for controlling the throttle opening control means in response to said control means.

10. The constant vehicle speed maintaining device for a motorcycle according to claim 9, wherein said DC servo-motor includes an output shaft and said control cable includes a first end operatively connected to said output and a distal end operatively connected to said throttle opening control means for imparting movement of said DC servo-motor output shaft to said throttle opening control means.

11. A constant vehicle speed maintaining device for a motorcycle, comprising:
   a throttle opening control means for controlling a throttle opening responsive to a turning torque of a throttle grip;
   a DC servo-motor for maintaining the throttle opening at a current vehicle speed in response to a constant vehicle speed maintaining instruction;

a current detecting means for detecting the current supplied to said DC servo-motor when said DC servo-motor is operating in response to said constant vehicle speed maintaining instruction; and a control means for canceling the constant vehicle speed maintenance and stopping the operation of said DC servo-motor when the current supplied to said DC servo-motor detected by said current detecting means is not less than a predetermined value.

12. The constant vehicle speed maintaining device for a motorcycle according to claim 11, wherein said control means cancels the constant vehicle speed maintenance when said current variation is not less than a predetermined amount and has continued for a predetermined period.

13. The constant vehicle speed maintaining device for a motorcycle according to claim 12, wherein said control means cancels the constant vehicle speed maintenance when a current variation due to a turning torque in a decelerating direction on said throttle grip is detected.

14. The constant vehicle speed maintaining device for a motorcycle according to claim 12, wherein said control means is an ECU for receiving input relative to at least a vehicle speed, engine revolutions, cruising state and the current on the DC servo-motor for determining the cruise speed control operation of the vehicle.

15. The constant vehicle speed maintaining device for a motorcycle according to claim 14, wherein said ECU includes a microcomputer for receiving inputted signals and for processing the signals to determine the cruise speed control operation of the vehicle.

16. The constant vehicle speed maintaining device for a motorcycle according to claim 15, wherein said microcomputer determines if the current on said DC servo-motor is not less than a predetermined value operating for a predetermined period of time for determining the cruise speed control operation of the vehicle.

17. The constant vehicle speed maintaining device for a motorcycle according to claim 11, wherein said control means cancels the constant vehicle speed maintenance when a current variation due to a turning torque in a decelerating direction on said throttle grip is detected.

18. The constant vehicle speed maintaining device for a motorcycle according to claim 11, and further including a control cable operatively positioned between said DC servo-motor and said throttle opening control means for controlling the throttle opening control means in response to said control means.

19. The constant vehicle speed maintaining device for a motorcycle according to claim 18, wherein said DC servo-motor includes an output shaft and said control cable includes a first end operatively connected to said output and a distal end operatively connected to said throttle opening control means for imparting movement of said DC servo-motor output shaft to said throttle opening control means.

* * * * *